United States Patent
Michiels et al.

(10) Patent No.: US 10,389,517 B2
(45) Date of Patent: Aug. 20, 2019

(54) USING SECURE KEY STORAGE TO BIND A WHITE-BOX IMPLEMENTATION TO ONE PLATFORM

(71) Applicant: NXP B.V., Eindhoven (NL)

(72) Inventors: Wilhelmus Petrus Adrianus Johannus Michiels, Reusel (NL); Jan Hoogerbrugge, Reusel (NL); Joppe Willem Bos, Wijgmaal (BE)

(73) Assignee: NXP B.V., Eindhoven (NL)

( * ) Notice: Subject to any disclaimer, the term of this patent is extended or adjusted under 35 U.S.C. 154(b) by 180 days.

(21) Appl. No.: 15/194,001

(22) Filed: Jun. 27, 2016

(65) Prior Publication Data

US 2017/0373828 A1 Dec. 28, 2017

(51) Int. Cl.
*H04L 9/00* (2006.01)
*G06F 21/75* (2013.01)

(52) U.S. Cl.
CPC .............. *H04L 9/002* (2013.01); *G06F 21/75* (2013.01); *H04L 2209/16* (2013.01)

(58) Field of Classification Search
CPC ................................ H04L 9/002; G06F 21/75
See application file for complete search history.

(56) References Cited

U.S. PATENT DOCUMENTS

| 8,479,016 B2 | 7/2013 | Michiels et al. |
| 8,625,794 B2 | 1/2014 | Michiels et al. |
| 2005/0108171 A1* | 5/2005 | Bajikar .................. G06F 21/31 705/51 |
| 2010/0251285 A1* | 9/2010 | Eisen ..................... H04N 7/163 725/31 |
| 2012/0297200 A1* | 11/2012 | Thom ..................... G06F 21/57 713/189 |

(Continued)

FOREIGN PATENT DOCUMENTS

| WO | 2010146139 A1 | 12/2010 |
| WO | 2010146140 A1 | 12/2010 |

OTHER PUBLICATIONS

U.S. Appl. No. 14/577,148, Michiels, W. et al., "Binding White-Box Implementation to Reduced Secure Element", filed Dec. 19, 2014.

(Continued)

*Primary Examiner* — Jason Chiang
(74) *Attorney, Agent, or Firm* — Daniel D. Hill

(57) ABSTRACT

A method for performing a secure function in a data processing system is provided. In accordance with one embodiment, the method includes generating and encoding an encryption key. The encoded encryption key may be encrypted in a key store in a trusted execution environment (TEE) of the data processing system. The encrypted encryption key may encrypted, stored, and decrypted in the key store in the TEE, but used in a white-box implementation to perform a secure function. The secure function may include encrypting a value in the white-box implementation for securing a monetary value on, for example, a smart card. In one embodiment, each time an encryption key or decryption key is used, it is changed to a new key. The method makes code lifting and rollback attacks more difficult for an attacker because the key is stored separately from, for example, a white-box implementation in secure storage.

9 Claims, 4 Drawing Sheets

(56) References Cited

U.S. PATENT DOCUMENTS

| | | | |
|---|---|---|---|
| 2015/0088756 A1* | 3/2015 | Makhotin | G06Q 20/3829 |
| | | | 705/71 |
| 2015/0229471 A1* | 8/2015 | Nair | H04L 9/0822 |
| | | | 713/171 |
| 2015/0248668 A1 | 9/2015 | Radu et al. | |
| 2015/0270956 A1* | 9/2015 | Basmov | G06F 21/602 |
| | | | 713/189 |
| 2015/0312226 A1 | 10/2015 | Michiels et al. | |
| 2016/0036826 A1* | 2/2016 | Pogorelik | H04L 63/105 |
| | | | 726/1 |
| 2016/0070932 A1 | 3/2016 | Zimmer et al. | |
| 2016/0086172 A1* | 3/2016 | Kamal | G06Q 20/3829 |
| | | | 705/71 |
| 2016/0182472 A1 | 6/2016 | Michiels et al. | |
| 2017/0017957 A1* | 1/2017 | Radu | G06Q 20/3829 |
| 2017/0019254 A1* | 1/2017 | Bone | G06F 21/575 |
| 2017/0228525 A1* | 8/2017 | Wajs | G06F 21/16 |
| 2017/0237551 A1* | 8/2017 | Van Foreest | H04L 9/002 |
| | | | 713/189 |

OTHER PUBLICATIONS

U.S. Appl. No. 14/705,635, Michiels, W. et al., "Implementing Key Scheduling for White-Box DES Implementation", filed May 6, 2015.

U.S. Appl. No. 14/971,851, Michiels, W. et al., "Wide Encoding of Intermediate Values Within a White-Box Implementation", filed Dec. 16, 2015.

U.S. Appl. No. 14/814,056, Michiels, W. et al., "Balanced Encoding of Intermediate Values Within a White-Box Implementation", filed Jul. 30, 2015.

U.S. Appl. No. 14/814,007, Michiels, W. et al., "Encoding Values by Pseudo-Random Mask", filed Jul. 30, 2015.

U.S. Appl. No. 14/952,737, Michiels, W., "Protecting White-Box Feistel Network Implementation Against Fault Attack", filed Nov. 25, 2015.

U.S. Appl. No. 14/941,474, Michiels, W., "Split-And-Merge Approach to Protect Against DFA Attacks", filed Nov. 13, 2015.

Cooijmans, T. et al.,"Analysis of Secure Key Storage Solutions on Android", https://www.cs.ru.nl/E.Poll/papers/AndroidSecureStorage.pdf, 2014, 10 pages.

Coombs, R., "Securing the Future of Authentication with ARM TrustZone-based Trusted Execution Environment and Fast Identity Online (FIDO)", https://www.arm.com/files/pdf/TrustZone-and-FIDO-white-paper.pdf, May 25, 2015, 7 pages.

Asokan, N. et al., "Mobile Platform Security—Trusted Execution Environments", http://asokan.org/asokan/Padova2014/tutorial-mobileplatsec.pdf, 2014, 122 pages.

Chow, S., Eisen, P., Johnson, H., van Oorschot, P.C.: White-Box Cryptography and an AES Implementation. Proceedings of the 9th Annual Workshop on Selected Areas in Cryptography, Aug. 15-16, 2002, 18 pages.

Chow, S., Eisen, P., Johnson, H., van Oorschot, P.C.: A White-Box DES Implementation for DRM Applications. Proceedings of the 2nd ACM Workshop on Digital Rights Management, Oct. 15, 2002, 16 pages.

* cited by examiner

USING SECURE KEY STORAGE TO BIND A WHITE-BOX IMPLEMENTATION TO ONE PLATFORM

BACKGROUND

Field

This disclosure relates generally to electronic device security and more specifically to using a secure key storage to bind a white-box implementation to one platform.

Related Art

More and more functionality in electronic devices is being implemented in software instead of hardware. Software has the advantage of being less costly, better scalability, easier to personalize, and easier to update. This is also true for security-sensitive applications. An important development for security-sensitive applications has been the addition of Host-Card Emulation (HCE) to the Android operating system. This makes it possible to fully implement contactless payment cards, such as transportation payment cards and other smart cards, by an application that runs on an application processor for a mobile phone. The downside, however, is that such an application runs in an unprotected environment, where the most realistic attack model is the so-called white-box attack model. In this attack model the attacker is assumed to have full access to and full control over the execution environment.

Several software protection techniques are known to protect a software implementation in the white-box attack model, such as code obfuscation, software tamper proofing, white-box cryptography, and just-in-time decryption. Although these techniques prevent an attacker (to a certain extend) from understanding and changing a software program, they do not protect against a rollback attack. A rollback attack is an attack in which an attacker restores the software to some earlier state. Suppose, for instance, that we have a transportation payment card with a payment application that stores a balance, which is lowered each time the user makes use of public transportation. The user can add money to increase the balance on the card from time-to-time as needed. However, using a rollback attack, a user may potentially restore the balance of the card by rolling back the payment application to a time when the balance was higher. This can be done by replacing the payment application having the lower balance by a previously made copy of the application having a higher balance.

Another challenge with white-box cryptography is code lifting. Although white-box implementations aim to hide the encryption key, an attacker may try to copy or isolate the complete cryptographic implementation and run it elsewhere.

The most secure way to implement a cryptographic algorithm is to use a secure element that is isolated, closed, and protected. A disadvantage of this approach is that it is relatively costly and not very flexible (e.g. not easy to upgrade or add applications). Alternatively, as a compromise, one can implement a cryptographic algorithm in software and run it on a fully open platform. Unlike the secure element, this solution is low cost and flexible. However, the disadvantage is its very strong attack model. Generally, it is most realistic to assume the attacker has full access to and full control over the cryptographic implementation.

An approach to security that falls in between these two solutions is a processor with both an unsecured execution environment for running user applications and a trusted execution environment (TEE). ARM® Trustzone® technology is an example of a TEE. A TEE is a secured execution environment that provides process isolation. The TEE runs in parallel (and may share resources with) a user space execution environment. The user space is fully open, runs a rich operating system (OS), and can interact with the TEE. The TEE does generally not provide tamper resistance, i.e., it does not implement countermeasures against for instance Differential Power Analysis (DPA) or Differential Fault Analysis (DFA). Applications can be installed on the TEE, but to guarantee security, this is limited and requires some effort. Therefore, a need exists for a way to make code lifting and rollback attacks types more difficult while maintaining the flexibility of a processor with a TEE.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
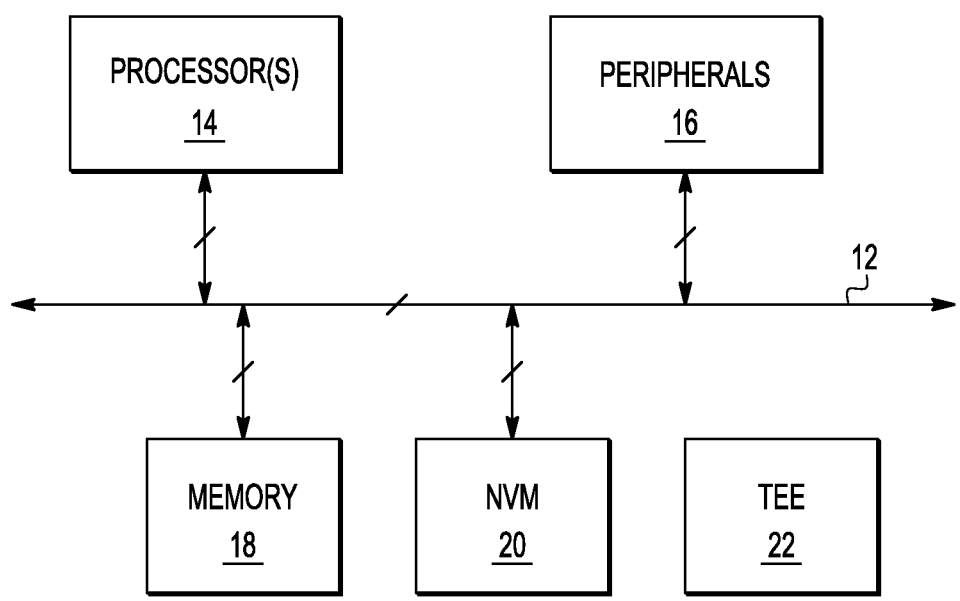
FIG. 1 illustrates a data processing system in accordance with an embodiment.

Generally, there is provided, a method for performing a secure function in a data processing system that makes code lifting and/or rollback attacks more difficult for an attacker. In one embodiment, the method includes inputting an encoded encryption key in the white-box implementation in an unsecured execution environment of the data processing system. The encoded encryption key may be encrypted in a key store in a trusted execution environment (TEE) of the data processing system. If a TEE is not available, the key store is used in user space. The encrypted key is encrypted, stored, and decrypted in a key store in the TEE, but used in the white-box implementation to perform the secure function, such as encrypting a value. Storing the encoded encryption key separately from the white-box implementation makes code lifting more difficult. Because the key is encoded, it is never in plaintext, thus making the embodiment more secure. Alternately, the encryption key is encoded and stored in the unsecure execution environment and used with a white-box implementation in the TEE to perform a secure function, such as encrypting or decrypting a value. As in the first embodiment, the key is stored separately from the white-box implementation, effectively binding the white-box implementation to the hardware. In another embodiment, the encryption key is encrypted and stored in a key store in a TEE. The encryption key is used to encrypt a data value in the key store, but the encrypted data value is stored in the unsecured execution environment. Each time the encryption key is used, it is changed to a new key. This also binds the white-box implementation to the hardware, and in addition, prevents a rollback attack because the new key will not match to the older encrypted value that the attacker tries to substitute for the current value.

In one embodiment, there is provided, a method for performing a secure function using a white-box implementation in a data processing system, the method comprising: receiving an encrypted encoded encryption key in the white-box implementation; storing the encrypted encoded encryption key using the TEE; decrypting the encrypted encoded encryption key using the TEE to generated a decrypted encoded encryption key; providing the decrypted encoded encryption key to the white-box implementation in the unsecured execution environment; and using the decrypted encoded encryption key to perform the secure function in the white-box implementation. Using the decrypted encoded encryption key to perform the secure function may further comprise using the decrypted encoded encryption key to encrypt a monetary amount in a payment application. Encoding the encryption key may further comprise encoding the encryption key using an exclusive-OR function. The secure function may comprise decrypting data. The method may further comprise storing the decrypted data in an unsecure memory location of the data processing system. The data processing system may be in a handheld device. Storing the encrypted encoded encryption key by the TEE may further comprise storing the encrypted encoded encryption key using a key store implemented via the TEE. Encrypting the encoded encryption key in a TEE may further comprise using a key store provided by the TEE to encrypt the encoded encryption key. The data processing system may be implemented in an integrated circuit.

In another embodiment, there is provided, a method for performing a secure function using a white-box implementation in a data processing system, the method comprising: inputting an encoded encryption key in the white-box implementation; storing the encoded encryption key in the unsecure execution environment; and using the encoded encryption key in a trusted execution environment (TEE) to perform the secure function using the white-box implementation. Encoding the encryption key may further comprise encoding the encryption key using one of a fixed mask, a linear function, or an affine function. The secure function may further comprise encrypting a data value. Storing the encoded encryption key in the unsecure execution environment may further comprise storing the encoded encryption key in a non-volatile memory. The encoded encryption key may be changed each time it is used to perform the secure function. The data processing system may be implemented in an integrated circuit.

In yet another embodiment, there is provided, a method for decrypting a data value in a data processing system, the method comprising: generating a decryption key; encrypting the decryption key in a key store supported by a trusted execution environment (TEE) of the data processing system; using the encrypted decryption key to decrypt a data value in the key store; storing the encrypted data value in unsecured memory of the data processing system; and changing the decryption key to a new decryption key each time it is used to decrypt a data value. Using the encrypted decryption key to decrypt a data value in the key store may further comprise using a software application in the key store to decrypt the data value. The data processing system may be implemented on an integrated circuit. Generating a decryption key may further comprise generating an encryption/decryption key pair, and wherein changing the decryption key to a new decryption key may further comprise changing the encryption/decryption key pair to a new encryption/decryption key pair each time one of the encryption key or decryption key of the pair is used to encrypt or decrypt a data value. The data value may be further protected using one or more of obfuscation and tamper proofing.

FIG. 1 illustrates a simple representation of a data processing system 10 in accordance with an embodiment. Data processing system 10 includes communication bus 12, processor(s) 14, peripherals 16, memory 18, non-volatile memory (NVM) 20, and TEE 22. In one embodiment, data processing system 10 is a system-on-a-chip (SoC) implemented on a single integrated circuit. In another embodiment, data processing system 10 may be implemented differently. Communication bus 12 is a conventional bus having a plurality of conductors for communicating address, data, and control information. In other embodiments, bus 12 may be an interconnect structure such as for example, a cross-bar switch or other form of SoC interconnect system. Processor(s) block 14 is bi-directionally connected to bus 12. Processor(s) 14 can include one or more of any type of processing element, such as a central processing unit (CPU), processor core, microprocessor, microcontroller, digital signal processor, and the like. There can be any number of processors. Peripherals 16 is bi-directionally connected to bus 12. Peripherals 16 add functionality to data processing system 10. Peripherals 16 can be processors or specialized processing elements, such as audio processors, video processors, modems, security elements, memory, etc. Also, a peripheral may include multiple modules or multiple central processing units or a combination of modules and central processing units. In addition, peripherals 16 may include control circuitry or other circuitry other than central processing units. Memory 18 and NVM 20 are each bi-directionally connected to bus 12 for providing and receiving data from the other blocks of data processing system 10. Memory 18 may include one or more of any type of memory such as volatile memory including static random access memory (SRAM) and dynamic random access memory (DRAM). Non-volatile memory 20 may include one or more of any type of NVM such as flash, magnetic random access memory (MRAM), electrically erasable programmable read only memory (EEPROM), one time programmable (OTP) memory, and the like.

A data processing system may implement a TEE in various ways. One way is to connect a separate external security co-processor to data processing system 10. Another way is to provide the separate security co-processor on the same integrated circuit as data processing system 10. The security co-processor is hardware that handles security chores such as device identification and authentication, secure storage, isolated program execution, and platform integrity. In another embodiment, the TEE may share the same hardware resources as the unsecure execution environment so that there is not a dedicated separate hardware security platform. ARM® Trustzone® technology is an example of this kind of secure environment. Data processing system 10 may be used in various systems, such as computers, automobiles, communications equipment, and handheld devices such as cell phones, tablets, smart cards, etc.

Figure 2:
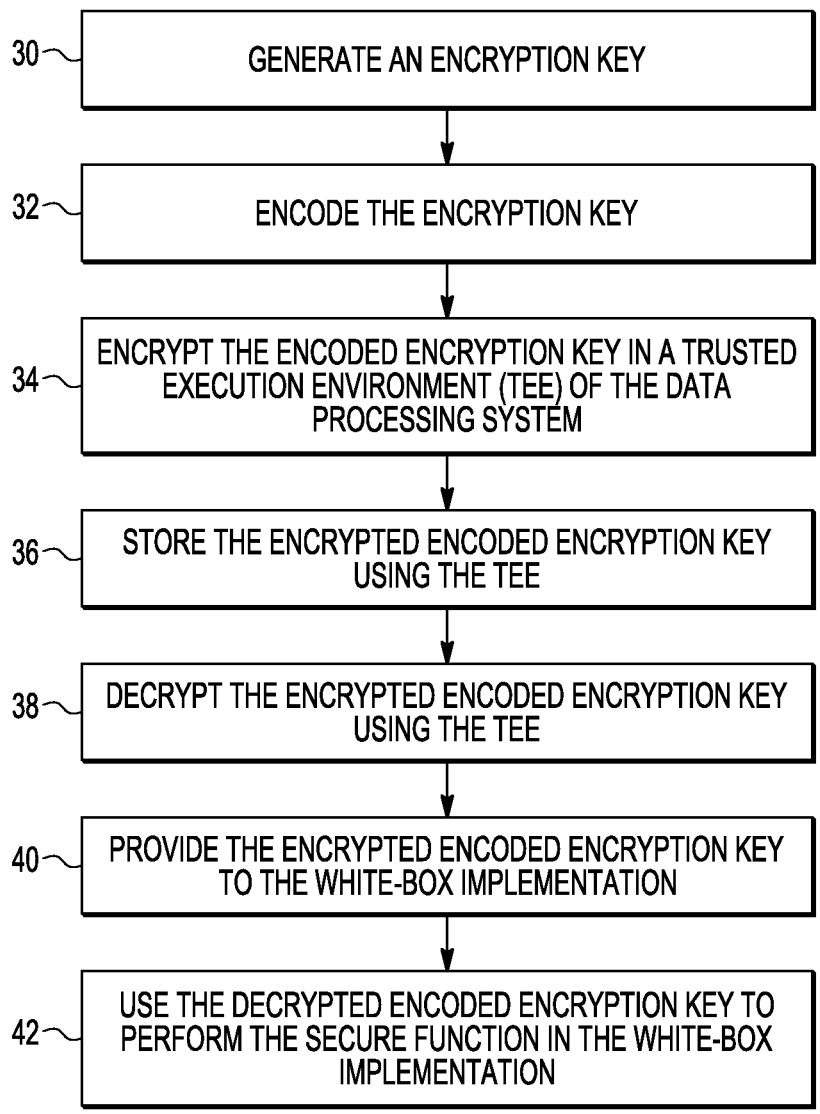
FIG. 2 illustrates a flow chart of a method for performing a secure function using a white-box implementation in the data processing system of FIG. 1 in accordance with an embodiment.

FIG. 2 illustrates a flow chart of a method 28 for performing a secure function using a white-box implementation in the data processing system of FIG. 1 in accordance with an embodiment. A white-box implementation in the user space may use, for example, a symmetric-key block cipher called data encryption standard (DES) published by the National Institute of Standards and Technology (NIST). In method 28, at step 30, an encryption key is generated. At step 32, the encryption key is encoded. The encoding is usually put on the key by the same party that generates the key. This may not be the device owner of the device on which the white-box implementation is installed. The content owner may generate the key. Ideally, a key is never in the clear on a device that is exposed to a white-box attack. If the device itself encodes the key this rule is violated. If, nonetheless, the device generates the key, then the generation of an encoded key should be done in one step (instead of first generating the key, and then encoding the key). An exclusive-OR (XOR) function may be used to encode the encryption key. To encode the encryption key, the encryption key may be XORed with, for example, a fixed mask, a linear function, or an affine function. At step 34, the encoded encryption key is provided to a key store in the TEE. The encoded encryption key is encrypted using an application of the key store. A key store is not a physical memory or other hardware. A key store is a software component with an API that enables storing keys as well as using keys. In the described embodiment, an encoded encryption key is stored using a key that is stored in the key store to encrypt and decrypt the encoded encryption key. An example key store is the Android Keystore system. At step 36, the encrypted encoded encryption key is stored using the key store in the TEE. At step 38, in preparation to being used, the encrypted encoded encryption key is decrypted using an application provided by the key store in the TEE. At step 40, the decrypted encoded encryption key is provided to the white-box implementation in unsecure storage such as for example, memory 18 or NVM 20. At step 42, the decrypted encoded encryption key is used to perform the secure function in the white-box implementation in the unsecure execution environment. The secure function may be encrypting a monetary value in a payment application for a mobile device or smart card. For example, the secure function may include encrypting or decrypting a value in, for example, a transit card for use with public transportation. The decrypted value, or other type of data, is stored in an unsecure memory location in, for example, NVM 20. Because the key is encoded, it is never in plaintext, thus making the embodiment more secure. In addition, storing the key in the TEE separates the key from the white-box implementation, effectively binding the white-box implementation to the hardware.

Figure 3:
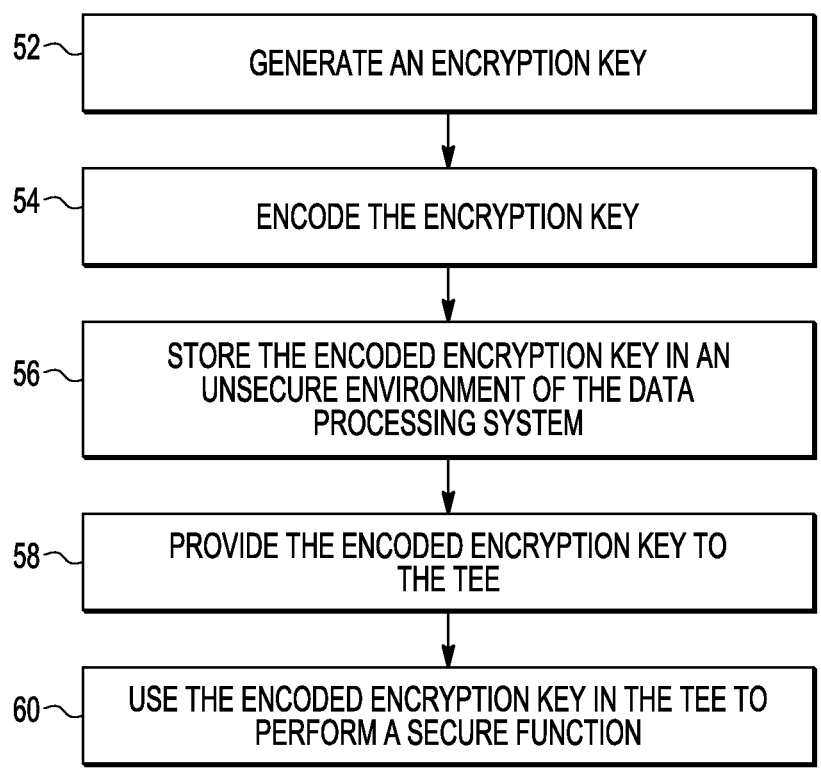
FIG. 3 illustrates a flow chart of a method for performing a secure function using a white-box implementation in the data processing system of FIG. 1 in accordance with an embodiment.

FIG. 3 illustrates a flow chart of a method 28 for performing a secure function using a white-box implementation in the data processing system of FIG. 1 in accordance with an embodiment. At step 52, an encryption key is generated. At step 54, the encryption key is encoded. The encoding is usually put on the key by the same party that generates the key. This may not be the device owner of the device on which the white-box implementation is installed. The content owner may generate the key. Ideally, a key is never in the clear on a device that is exposed to a white-box attack. If the device itself encodes the key this rule is violated. If, nonetheless, the device generates the key, then the generation of an encoded key should be done in one step (instead of first generating the key, and then encoding the key). An exclusive-OR (XOR) function may be used to encode the encryption key. To encode the encryption key, the encryption key may be XORed with, for example, a fixed mask, a linear function, or an affine function. The encoded encryption key may be generated elsewhere and inputted into the white-box implementation in accordance with an embodiment. At step 56, the encoded encryption key is stored in an unsecure memory location such as NVM 20. The encryption key is not stored in the unsecure execution environment in plaintext. At step 58, the encoded encryption key is provided to the TEE. At step 60, the encoded encryption key is used in the TEE to perform a secure function such as encrypting or decrypting a data value, such as a monetary value stored on a transit card. The encoded encryption key is stored in the unsecure memory while the white-box implementation is in the TEE. This keeps the encryption key separate from the white-box implementation so that the white-box implementation is bound to the data processing system. Also, as discussed above for method 28, the encryption key may be changed each time it is used to encrypt or decrypt a data value.

Figure 4:
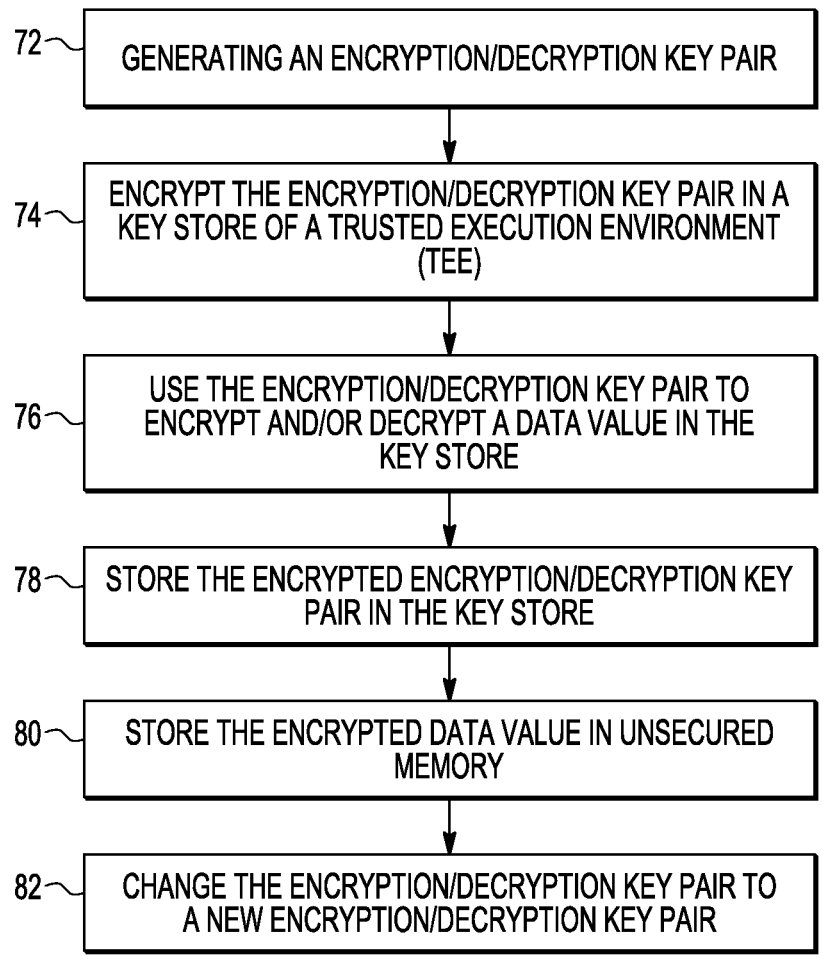
FIG. 4 illustrates a flow chart of a method for encrypting a data value using a white-box implementation in the data processing system of FIG. 1 in accordance with an embodiment.

FIG. 4 illustrates a flow chart of a method 70 for encrypting a data value in the data processing system of FIG. 1 in accordance with an embodiment. At step 72, an encryption/decryption key pair is generated. At step 74, the encryption/decryption key pair is encrypted using a software application in a key store supported by a TEE. The key store may be the Android Keystore API. Different key store applications may work differently. At step 76, the encrypted encryption/decryption key pair is used in the key store in the TEE, using a key store application. The key may be encrypted using, for example, the RSA encryption algorithm. Typically, the key store supports various encryption algorithms including DES (Data Encryption Standard) and AES (Advanced Encryption Standard). The encryption key may be used to encrypt a data value in the TEE, or the decryption key or the key pair may be used to decrypt a data value in the TEE. The data value may, for example, be a monetary value on a transit card. At step 78, the encrypted encryption/decryption key pair is stored in the key store of the TEE, and at step 80, the encrypted data value is stored in unsecured memory, such as NVM 20. At step 82, the encryption/decryption key pair is changed. The encryption/decryption key pair is changed each time one of the encryption key or decryption key is used to encrypt or decrypt a data value. The pair is stored in secured storage such as a key store. U.S. Pat. No. 8,625,794 by Michiels describes a possible approach for efficiently changing keys in a white-box implementation. Because the key is changed after each transaction and secured in a key store, the encryption key is not available to a hacker. Therefore, a rollback attack, where an entire transaction application is replaced by an earlier version, will not work. The data value may be further protected using one or more of obfuscation and tamper proofing of data processing system 10.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for performing a secure function using a white-box implementation in a data processing system, the method comprising:

generating an encryption key;

encoding the encryption key;

encrypting the encoded encryption key to generate an encrypted encoded encryption key;

receiving the encrypted encoded encryption key in the white-box implementation;

storing the encrypted encoded encryption key using a trusted execution environment (TEE);

decrypting the encrypted encoded encryption key using the TEE to generate a decrypted encoded encryption key;

providing the decrypted encoded encryption key to the white-box implementation in the unsecured execution environment; and using the decrypted encoded encryption key to perform the secure function in the white-box implementation, wherein the decrypted encoded key is encoded and not in plaintext when being used in the white box implementation, and wherein the encryption key is stored separately from the secure function in the white-box implementation to bind the white-box implementation to the TEE.

2. The method of claim 1, wherein using the decrypted encoded encryption key to perform the secure function further comprises using the decrypted encoded encryption key to encrypt a monetary amount in a payment application.

3. The method of claim 1, wherein encoding the encryption key further comprises encoding the encryption key using an exclusive-OR function.

4. The method of claim 1, wherein the secure function comprises decrypting data.

5. The method of claim 4, further comprising storing the decrypted data in an unsecure memory location of the data processing system.

6. The method of claim 1, wherein the data processing system is in a handheld device.

7. The method of claim 1, wherein storing the encrypted encoded encryption key by the TEE further comprises storing the encrypted encoded encryption key using a key store implemented via the TEE.

8. The method of claim 1, wherein encrypting the encoded encryption key in a TEE further comprises using a key store provided by the TEE to encrypt the encoded encryption key.

9. The method of claim 1, wherein the data processing system is implemented in an integrated circuit.

* * * * *